June 24, 1930.  E. N. BACHELDER  1,767,956
APPARATUS FOR INFUSING COFFEE, TEA, AND THE LIKE
Filed May 22, 1929
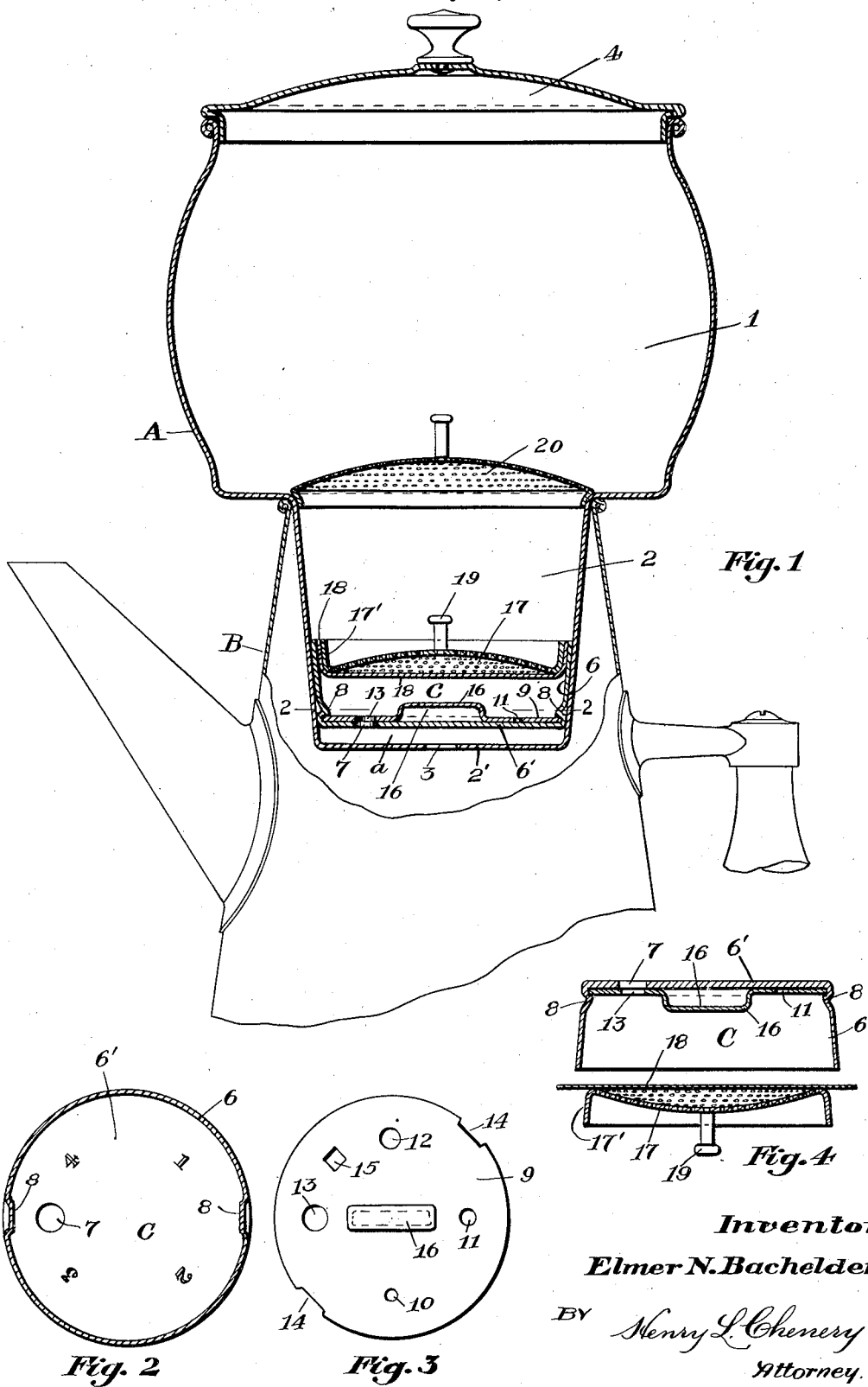
Inventor:
Elmer N. Bachelder
BY Henry L. Chenery
Attorney.

Patented June 24, 1930

1,767,956

UNITED STATES PATENT OFFICE

ELMER N. BACHELDER, OF PORTLAND, MAINE

APPARATUS FOR INFUSING COFFEE, TEA AND THE LIKE

Application filed May 22, 1929. Serial No. 365,199.

The invention hereinafter to be described relates to apparatus by means of which coffee and tea beverages may be prepared by what is commercially known as the infusion process, the predominant feature of which is its capacity to procure the extraction of a product always uniform in quality and strictly hygienic in character.

The present invention embodies improvements on the apparatus disclosed by U. S. Patent No. 1,665,199, granted to me April 10th, 1928.

The conventional or olden time method of preparing coffee from the coffee bean was very informal in that it involved simply placing a certain amount of the coarsely ground coffee bean in a pot, adding a quantity of water and allowing the mixture to boil until it was thought, only by observing its color, to be ready to serve—the definiteness as to the length of the boiling period being wholly a matter of guess work.

It is well known by competent dietitians that the boiling of coffee and tea beyond a certain length of time liberates the mildly poisonous constituents of these products, caffeine and theine, the assimilation of which latter by the human system, when taken even in small quantities but extending over a protracted period, often results in an impairment of the health and wellbeing of the consumer.

Insofar as the fundamental principle of time-regulated infusion is concerned, this apparatus is in a general way quite similar to my former device; structurally, however, I have incorporated in my present invention several very important improvements over my former conception.

These advantages and objects considered in a comparative sense with my former invention are, in part, as follows:

First: To provide a more effective construction as relates to the filtration capacity of the filtering element.

Second: To be able to greatly reduce the size of the entire infusing apparatus, due to the more efficient operation of its parts.

Third: To protect the time-infusing elements from possible injury in handling, by placing them wholly within the outside container.

Fourth: To provide a more convenient construction with respect to the assembling of the parts preparatory to putting into effect the infusion process, and Fifth: To combine the parts immediately concerned with the infusing operation so that they form a unitary structure capable of being employed and utilized in various containers—such as aluminum, steel, china or glass ware.

The character of the invention may best be understood by reference to the description found in the following specification, when taken in connection with the accompanying drawing in which is disclosed an illustrative embodiment thereof.

In the drawing—

Fig. 1 is a central sectional elevation of my infusing apparatus;

Fig. 2 is a sectional plan of the regulator cup—showing the bottom thereof, the section being taken on line 2—2, Fig. 1;

Fig. 3 is a plan view of the regulator disc, and

Fig. 4 is a view illustrating a preferred method of assembling the parts with especial reference to the placing of the filter paper in the combination.

Similar reference characters are used to identify like parts in all views of the drawing.

Referring to the drawing, 1 represents the water-holding portion of the container A, and 2 that portion in which the ground coffee is placed incident to the infusing operation. Various shapes or designs for this container may be employed and any proper material used in its construction. For commercial purposes, generally, aluminum ware seems best suited for the purpose although china and glass ware have a certain appeal and may be used, this latter material having the advantage of allowing observation of the process when under way and is also desirable from a sanitary standpoint.

The tapering, reduced portion 2 has an orifice 3 in its bottom through which the finished beverage may pass to any convenient receptacle B, and the enlarged portion 1 is equipped with a cover 4.

Closely fitting the tapering wall of the coffee container 2 is a regulator cup C, the wall 6 of which comes to a seat on the container wall when the bottom 6' thereof is disposed at a short spaced distance above the bottom 2' of the container 2—a space a intervening between the two parts.

In the bottom 6' (see Figs. 1 and 2) is a large aperture 7 and on the tapering wall of the cup, near its bottom, are oppositely disposed, inwardly projecting embossments 8.

Lying in close contact with the top side of the bottom 6' is a regulator disc 9 (see Figs. 1 and 3) in which are a plurality of apertures, 10, 11, 12 and 13—four in number being shown simply to illustrate the idea.

In order to permit the disc 9 to pass the embossments 8 as it is being positioned on the top of the bottom 6', its periphery is cut away at 14, 14. When fully seated and slightly rotated, the disc will operate beneath the embossments, and in this position cannot be removed from the cup C. Thereafter, rotation of the disc will bring the apertures 10, 11, 12 and 13 successively into register with the aperture 7. The size of the disc aperture regulates or determines the quantity of the beverage which it is possible to discharge from the infuser in any given period of time—this latter being constant in all cases regardless of the quantity discharged and is fixed by the permissible length of time in which to complete the infusing process, which generally is considered to be from six to eight minutes when finely ground or powdered coffee is used.

It will be observed that on the top side of the bottom 6' are engraved or stamped the indicating numerals 1, 2, 3 and 4, these figures being disposed on a circle the radius of which is coextensive with the radius on which is made the square aperture 15 in the disc 9. When the disc is rotated to a position in which the aperture 13 is in register with the aperture 7 (as seen in Fig. 1), the indicating numeral 4 may be seen through the aperture 15. This indicates that the regulating parts are set to infuse four cups of coffee within the prescribed limit of time allowable to complete the infusion process.

In like manner, if the disc is rotated so that the aperture 15 lies over the indicating numeral 3 the aperture 12 will be in register with the aperture 7 and three cups of coffee will be infused in substantially the same period of time as was required, in the first instance, to infuse four cups.

The upwardly extending embossment 16 serves as a convenient means by which to rotate the disc 9.

In my former patented device the discharge regulating elements were so disposed on the apparatus that the liability of injury thereto by the parts being dented or deformed from rough handling, was always present.

In my present invention I have simplified the structure and have removed the actuating parts to a point of safety in the apparatus, and by so doing I have dispensed with one tight fitting joint required on my older device—the one between the outside cup and the wall of the container, as was disclosed in my former patent hereinbefore referred to by date and number.

Within the regulator cup C is a finely perforated disc 17 which I preferably concave on the under side, this particular shape, however, not being material as the object is to provide a space between the perforate disc and the filtering element. Across the under margin of this disc is stretched the filter paper 18 which I make of sufficiently large diameter to extend upwardly where it is secured between the flange of the disc, 17', and the wall of the cup C. It will be observed that in this construction the full underlying portion of the filter paper is available for filtration purposes, whereas, if it was superimposed on the disc a considerable portion, probably from one-half to two-thirds of the entire area of the paper would be blocked off by the solid portion of the perforate disc.

The significance of this improved method of allocating the filtering element resides in the following very pertinent facts: It makes possible the supplying of an infusing apparatus of much reduced dimensions but of the same capacity of my former device; it lowers quite materially the cost of filter paper; permits of lower manufacturing costs—with a consequent reduction in the sale price; provides an article of more refined appearance and necessitates less cumbersome receptacles in which to collect the prepared beverage.

To more conveniently manipulate the disc 17 while assembling the parts immediately connected with the regulating elements, as well also as to provide means by which the assembled parts may, as a unitary structure, be inserted in the container, I equip the disc with a handle 19.

A cover 20, having fine perforations therein, fits the upper end of the coffee container 2 and prevents more or less of the dry coffee rising to the surface of the water when the latter is poured into the portion 1 of the container—the floating coffee loosing the full effect of the infusion, was it not confined.

Whether success or failure is met with in exploiting a mechanical device depends largely on the ease and convenience with which the operation of the same can be performed.

In my present infusing apparatus the first move to make in putting the infusing process into effect is to insert the disc 9 in the regulator cup C, rotate it so that the indicating figure which represents the number of cups of beverage it is desired to prepare appears through the aperture 15. Then, holding in an inverted position the disc 17 by means of the handle 19, place a sheet of the filter paper thereon and force the cup C on to the disc, the outer, marginal portion of the paper being held between the flange 17′ and the wall of the cup C. Thus the four elements, C, 9, 17 and 18 are assembled as a unit which may now be inserted in the portion 2 of the container—using the handle 19 for this purpose, (see Fig. 4).

Next, the proper amount of coffee is turned into the container 2, the cover 20 put in place and after the whole combination has been located over the beverage receptacle B, an amount of boiling water corresponding to the number of cups of beverage to be made is poured into the container 1. The infusion operation is now under way and is accomplished automatically with respect to the time required to complete the infusing process.

So as to obtain from the infusion process, in the limited time allowable, the largest percent possible of the desirable constituents of the coffee, I use in my present aparatus the finest ground coffee obtainable and procure by filtration a clear and healthful beverage.

Although the size of the apparatus is greatly reduced from that of my former device, its capacity in quantity discharge of the extract is equal—due to the fact that all of the surface of the filtering element is available for this purpose and is utilized to the best advantage with pulverized coffee.

Furthermore, the adaptability of the filtering and regulating elements for use in a wide variety of containers, including pottery products, china and glass ware, commends itself to the progressive housekeeper, and in this respect, also, is greatly superior to my patented invention in that it is more self-contained, can be inserted as a unitary structure in any one of the containers of the proper size made from any of the different materials mentioned, as well as those made from metallic substances.

Having thus described my invention, what I claim and desire to secure by Letters Patent is:

1. In apparatus of the class described, the combination with a water and coffee holding container having a perforate bottom, a cup within the lower portion of said container, a finely perforated disc in said cup, a filtering element disposed beneath and in spaced relation to said disc except at its marginal portion which is secured between the periphery of said disc and the wall of said cup, and means to predeterminedly delay the passage of the beverage from said cup whereby said filtering element may be submerged, either completely or partially, in said beverage during the filtration process.

2. In apparatus for infusing coffee and tea comprising in combination, a coffee container, a regulator-cup having a single aperture in the bottom thereof, a regulator-disc in said regulator-cup having a plurality of apertures therein, said apertures adapted, singly, to register with the first mentioned aperture upon the rotation of said disc, a flanged perforate disc disposed in the upper end of said regulator-cup and adapted to support the bulk coffee while being infused, and a filter-paper element disposed interjacent said discs and in spaced relation to each thereof.

3. In apparatus of the class described the combination with a coffee container having a perforate bottom, a regulator-cup in said container having one perforation in the bottom thereof, a perforate disc in the upper portion of said regulator-cup, a filter-paper sheet disposed in vertically spaced relation to and beneath said disc and secured, at its margins, to said regulator-cup, a regulator disc revolubly mounted on the top side of the bottom of said regulator-cup and spaced from said filter-paper sheet, a plurality of outflow-regulating apertures in said regulator-disc adaptable of being brought, singly, into registration with the aperture in said regulator-cup bottom, and means on said regulator-disc to rotate the same.

4. In apparatus for infusing coffee and tea the combination with a water and coffee-holding container having a reduced lower portion with an aperture therein, a regulator-cup fitting the lower portion of said container and having in its bottom a single aperture radially spaced from its axis, a flat disc revolubly mounted on the top side of the bottom of said regulator-cup, a plurality of discharge apertures in said disc uniformly increasing in size from the smallest to the largest and each thereof adapted to be brought, singly, into registration with the aperture in said regulator-cup bottom by the rotation of said disc, means to positively secure said disc against displacement from said regulator-cup, a filtering element suspended in space above said disc, and a flanged, finely perforated disc disposed above and in spaced relation to said filtering element, said perforate disc adapted to secure said filtering element in said regulator-cup and to support the bulk coffee within said coffee container during the infusing operation.

5. In apparatus for infusing coffee and tea comprising in combination with a coffee container, a regulator-cup within and fitting closely the wall of said container and having in its bottom a single aperture, a flat disc revoluble within said regulator-cup and adapted to closely seat on the bottom thereof, a notched out portion on opposite edges of said disc, a plurality of varying size apertures in said disc, each thereof adapted to be brought, singly, into register with the aperture in said regulator-cup, inwardly disposed embossments on opposite sides of the vertical wall of said regulator-cup adapted to engage said notched out portions of said disc when the latter is being assembled in said regulator-cup and to superimpose on the top surface of said disc when the latter is slightly rotated, said embossments serving to prevent displacement of said disc from said regulator-cup, an upwardly, concaved, finely perforated disc having a circular flange thereon, disposed in the upper portion of said regulator-cup, and a filter paper disc lying beneath said perforate disc and contacting therewith at the flange of the disc, only, the skirt of said filter paper disc extending upwardly and secured between the said flange and the wall of said regulator-cup.

6. In a coffee and tea infusing apparatus comprising in combination with a coffee-holding container, a regulator-cup disposed within said container and having in its bottom a single aperture, a revoluble disc having a plurality of apertures therein uniformly increasing in size from the smallest to the largest, each thereof registrable with the aperture in said regulator-cup when said disc is rotated, means to rotate said disc, a finely perforated, flanged disc disposed in the upper end of said regulator-cup, a handle on said flanged disc, a filtering element secured in said regulator-cup and disposed in vertically spaced relation to and interjacent the two said discs, the skirt of said filtering element being frictionally held between the flange of said perforate disc and the wall of said regulator-cup, a plurality of indicating characters on the top side of the bottom of said regulating-cup, and an aperture in said revoluble disc so disposed thereon as to bring, singly, each of said characters into view through said aperture when said revoluble disc is rotated.

In testimony whereof I affix my signature.

ELMER N. BACHELDER.